(12) United States Patent
Bauer et al.

(10) Patent No.: US 8,049,602 B2
(45) Date of Patent: Nov. 1, 2011

(54) IN-TRANSIT CAR ALARM

(76) Inventors: Alan Joseph Bauer, Jerusalem (IL);
Philippe Daniel Blumenthal, Atlanta, GA (US); Dorit Shiff, Netanya (IL)

( * ) Notice: Subject to any disclaimer, the term of this patent is extended or adjusted under 35 U.S.C. 154(b) by 443 days.

(21) Appl. No.: 12/288,317

(22) Filed: Oct. 20, 2008

(65) Prior Publication Data
US 2009/0134986 A1 May 28, 2009

(51) Int. Cl.
*B60R 25/10* (2006.01)

(52) U.S. Cl. ........... 340/426.23; 340/426.22; 340/426.1; 340/5.3; 340/5.51

(58) Field of Classification Search ............. 340/426.23; 362/501
See application file for complete search history.

(56) References Cited

U.S. PATENT DOCUMENTS

| | | | |
|---|---|---|---|
| 4,638,293 A | 1/1987 | Min | |
| 4,975,678 A | 12/1990 | Hwang | |
| 5,515,419 A | 5/1996 | Sheffer | |
| 5,557,254 A | 9/1996 | Johnson et al. | |
| 5,572,185 A | 11/1996 | Chen et al. | |
| 6,013,538 A | 1/2000 | Burrows et al. | |
| 6,023,259 A | 2/2000 | Lewis | |
| 6,069,443 A | 5/2000 | Jones et al. | |
| 6,155,416 A | 12/2000 | Jaime | |
| 7,142,096 B2 | 11/2006 | Eisenman | |
| 7,866,861 B2 * | 1/2011 | Alexander | 362/503 |
| 2004/0130442 A1 * | 7/2004 | Breed et al. | 340/443 |
| 2005/0025881 A1 * | 2/2005 | Daniels | 427/66 |
| 2005/0073423 A1 * | 4/2005 | Kim | 340/686.1 |
| 2008/0169913 A1 * | 7/2008 | Yu | 340/426.23 |

* cited by examiner

*Primary Examiner* — Daniel Wu
*Assistant Examiner* — Frederick Ott

(57) ABSTRACT

The present invention describes a car anti-theft system. Specifically, the present invention has an organic light-emitting diode (OLED) patterned onto a visible surface of a vehicle. Vehicle theft is recognized when an unauthorized driver fails to enter a predetermined code, resulting in lighting of OLED. Lighted OLED may be seen by passers-by who may then alert police that a car is in the process of being stolen. Alternatively and additionally, OLED's may be integrated into primary car alarm systems so as to add an additional, visual, layer of car protection.

13 Claims, 7 Drawing Sheets

IN-TRANSIT CAR ALARM

BACKGROUND OF THE INVENTION

1. Field of the Invention

This invention pertains to a car theft-protection system that creates visual signals on car windows or exteriors to alert passers-by in real time that a car in question is being subject to theft and is being driven by an unauthorized driver.

2. Description of the Related Art

Every 26 seconds a car is stolen in the US (more than 1.2 million cars per year). The vast majority of vehicles are taken apart for parts as the parts' sum total value is greater than that of the stolen vehicle. Additionally, parts cannot be identified as easily as the original auto. Most anti-theft systems work either prior to the theft or after the car has arrived at a "chop shop" for dismemberment. The former systems are designed to prevent unauthorized use of the car by either physically or electronically disabling the car or alternatively sounding an alarm. For example, a bar placed across the steering wheel or special pre-ignition numerical codes are two common systems used to prevent a thief from starting and then stealing a car. At the other end of the theft, many cars can be identified through GPS-accessible chips that are hidden deep in the auto chassis or engine block. Car thefts are down on some newer models as thieves worry that they will be tracked down and identified after theft.

Organic light-emitting diodes (OLED's) have been described in patents (U.S. Pat. Nos. 6,013,538, 6,069,443, and 6,023,259 for example). To date, OLED applications for vehicles and specifically vehicle alarm systems have not been described.

It is noted that there are alarm systems that show their "on" status through a light on a car window. Such systems do not include OLED's that are powered up directly in response to the stealing of a car.

SUMMARY OF INVENTION

The car anti-theft system described herewith allows for the identification of a stolen car during the actual period of auto theft. The system in some embodiments is based on one or more light-emitting elements that are attached to a portion of a car window and are activated during unauthorized travel. Specifically, the invention includes the following:

A car anti-theft system including a vehicle surface onto which is either patterned or placed an organic light-emitting diode (OLED). Additionally, there are a human interface keypad, and a battery that is in electrical contact with the organic light-emitting diode and the human interface keypad.

The system may additionally include an accelerometer attached to the human interface keypad.

An additional aspect of the system has the organic light-emitting diode minimally including a cathode, an anode and an organic light-emitting material sandwiched between the electrodes.

Another aspect of the system has one or more organic light-emitting diodes forming a word pattern that can be read outside of the car window.

In yet another aspect of the system, the word pattern formed by OLED components reads "CALL 911".

In still another aspect of the system, the word pattern formed by OLED components reads "STOLEN".

In still another aspect of the system, the vehicle surface used for OLED patterning is a front windshield of a car.

The invention includes a method for preparing a car anti-theft system including the steps of: providing a car window; patterning at least one organic light-emitting diode (OLED) on a surface of the car window; attaching the OLED-patterned car window to a car; electrically coupling the OLED components to a battery; and, linking the battery to a human interface keypad.

In one aspect of the method, the OLED is minimally comprised of a cathode, an organic light emitting material and an anode.

In yet another aspect of the method the car window patterned with one or more OLED's is the front windshield.

In a further aspect of the method, the human interface keypad is located in the cabin of the car and easily accessed by the driver during travel.

In an additional aspect of the method, the electrical coupling is performed by separately attaching the cathode and the anode with wires to a battery.

The invention includes a more general car anti-theft system comprising an external car surface, a light emitter patterned onto an external car surface, and battery electrically contacted to the emitter.

An additional aspect of the invention has the emitter patterned on multiple external car surfaces.

An additional aspect of the invention has a controller that can determine when the car is stolen so as to activate the light emitter patterned on the external car surface.

The invention includes a system for enhancing a vehicle alarm system, including: a primary alarm system associated with a vehicle, and organic light-emitting diodes (OLED's) patterned on the vehicle surface, wherein activation of the primary alarm system causes said diodes to become lighted.

One aspect of the system has OLED's minimally including a cathode, an organic light emitting material and an anode.

In another aspect of the invention, the system has the vehicle surface realized as a front windshield.

In another aspect of the invention, the system consists of a primary alarm system that includes a GPS detection component.

In another aspect of the invention, the system includes OLED's that are composed of multiple colors.

In another aspect of the invention, the system has OLED's that are realized as a plurality of unique OLED's.

In another aspect of the invention, the primary alarm system gives off an audible signal should vehicle be subject to theft.

BRIEF DESCRIPTION OF THE DRAWINGS

For a better understanding of these and other objectives of the present invention, reference is made to the following detailed description of the invention, by way of example, which is to be read in conjunction with the following drawings, wherein.

DESCRIPTION OF THE PREFERRED EMBODIMENT

Figure 1A:
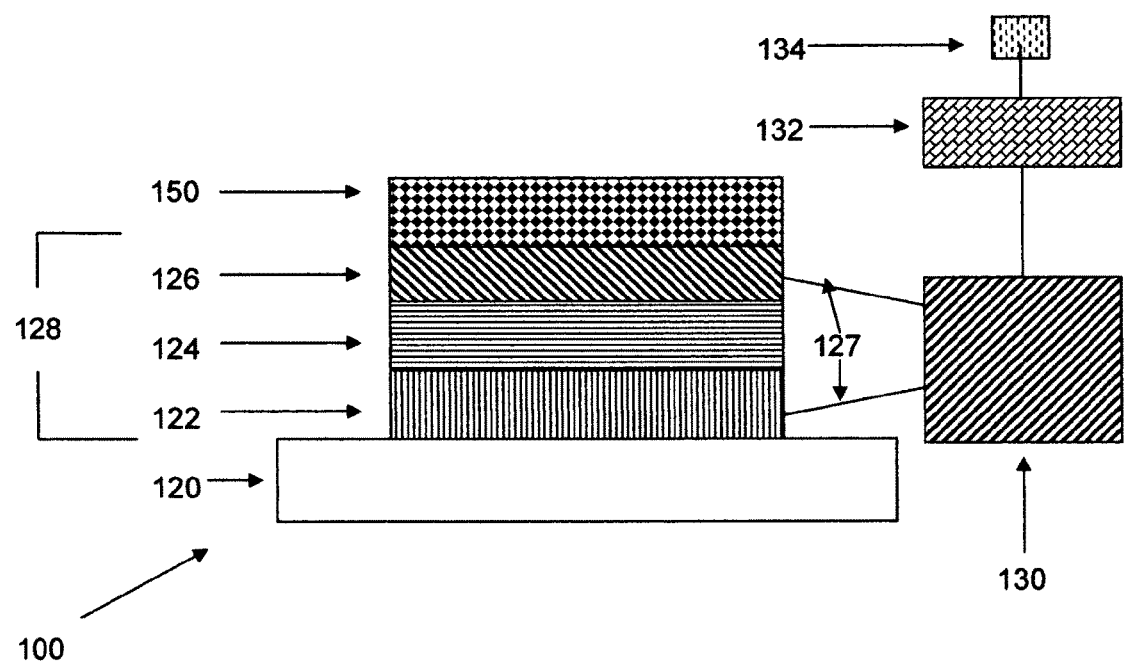
FIG. 1a is a schematic view of an organic light-emitting diode (OLED) as used in the present invention.

In the following description, numerous specific details are set forth in order to provide a thorough understanding of the present invention. It will be apparent, however, to one skilled in the art that the present invention may be practiced without these specific details. In other instances well-known circuits and control logic have not been shown in detail in order not to unnecessarily obscure the present invention.

Definitions

Certain terms are now defined in order to facilitate better understanding of the present invention.

"Car", "car battery", "windshield", "window", "driver", "thief" and "alarm", "vehicle" generally have their normal meaning. "Inner face" of a car window refers to the side of a car window that is inside the car when the window assumes its normal position in the car.

"OLED" refers to a light-emitting diode with any appropriate organic material being used as light-emitter component of the light-emitting diode. "OLED's" refers to more than one OLED. OLED's employed in the present invention minimally have an organic material sandwiched between two conductive electrodes, generally referred to as "cathode" and "anode". "Car window OLED" refers to an OLED that is placed or patterned on a window of a car. That is, a car window acts either as a transparent substrate upon which an OLED is constructed or as a surface on which a preformed OLED is attached.

"Patterned OLED" refers to one or multiple OLED's arranged to form letters or words in any language. Alternatively, patterned OLED's may take on shapes corresponding to numbers, stripes or geometrical elements.

"External car surface" refers to a surface of a car that is external to the interior portion of a car such as the outside portion of doors or windows, front grill or license plates.

"Organic light-emitting material" refers to an organic compound that can emit light when said organic compound is part of an OLED.

"Human interface keypad" refers to a device with which a driver interacts so as to keep car window OLED turned off. Interaction may be passive or require active participation of driver. A "controller" is a device that can determine that a car is being subject to theft and can active light emitting devices that are visible outside of a car or vehicle.

"Organic", "inorganic", and "polymer" have their normal meaning in the chemical arts.

"Light-emitter" refers to a material, organic or inorganic, that can generate light as a result of being subjected to an applied voltage.

"Electrode", "anode", "cathode", "hole-transport", and "electron-transport" have their normal meaning in the electrical arts. "Electrodes" when used alone refers to one cathode and one anode.

"Conductive" has its normal meaning as applied in the electrical arts.

"Car surface" may refer to any surface, internal or external, associated with a car or other vehicle. A window is a non-limiting example of a car surface.

It is understood that the words "car" and "vehicle" are used interchangeably.

A "secondary alarm system" is a vehicle protection system separate from the present invention that may be activated or alerted by activation of OLED's or other elements associated with some embodiments of the present invention. A secondary alarm system may be directly or indirectly activated by or associated with vehicle ignition.

A "primary alarm system" is a vehicle alarm or vehicle protection system that does not include OLED's patterned on vehicle surfaces. An alarm that makes audible sounds when a car door is forced open or a system that reports GPS coordinates of a vehicle when the vehicle's ignition has been activated are non-limiting examples of primary alarm systems. Any alarm system that does not involve patterned OLED's or other lighting elements on a vehicle surface (not including headlights and taillights that may flash or shine in response to an attempted theft) may be considered a "primary alarm system" for the present invention. "Activation" of a primary alarm system refers to the system being turned on in response to an attempted theft of vehicle.

Without being bound by any particular theory, the following discussion is offered to facilitate understanding of the invention. The car anti-theft system herein described is based on the fact that stolen cars must often travel a significant distance from the point of theft to the final destination chosen by the car thief The car anti-theft system herein described utilizes a novel method of detecting and warning that a car has been stolen in the absence of the owner of the vehicle. Uniquely, the present invention describes a light-emitting based system that can visually alert passers-by that a car is presently in the process of being stolen and that authorities should be contacted.

One period of a typical car theft not adequately addressed in current anti-theft systems is the time from theft to arrival at a chop shop. Most stolen cars are high-value vehicles and such autos are generally found in more expensive urban areas or suburbs. Chop shops and the like are usually in poorer neighborhoods or sparsely-populated areas far away from the scene of a crime. The implication of this disparity is that a stolen car may travel 20 or more miles from the site of its theft to the point of its dismemberment. Over this distance, the thief passes numerous other cars and pedestrians. The drivers of the former and those on the sidewalks cannot know that a given car is stolen. If the thief has overcome the initial immobilization strategies, then he/she looks like any other driver. The present invention offers a way for a car to present a visual signal that it is being subject to a car-jacking or theft. The present invention presents light-based warning signs on one or more car windows or external surfaces that can easily and immediately alert passers-by of the status of the car and allow for timely police intervention. The system thus adds another layer of car protection beyond immobilization strategies and preempts the post-facto GPS search.

First Embodiment

Reference is now made to FIG. 1a, which is a schematic view of a car anti-theft system (100) that is constructed and operative in accordance with a preferred embodiment of the present invention. In FIG. 1a is shown a side view of an OLED patterned onto a car window. Specifically, car window (120) serves as transparent substrate for a conductive anode (122) layer of indium tin oxide (ITO). Indium tin oxide is optically-transparent and serves to inject holes into an organic light emitting material (124) that sits directly above the ITO conductive anode (122). Above the organic light emitting material (124) layer is a gold conductive cathode (126) that injects electrons into the organic light emitting material (124). Note that conductive cathode (122) and conductive anode (126) are attached through wires (127) to a battery (130). Car window (120), conductive cathode (122), organic light-emitting material (124) and conductive anode (126) together form an OLED (128) according to the present invention. Layer thicknesses and methods of deposition of the various layers of the OLED (128) are determined to allow maximal light generation without optical interference for driver when the OLED (128) is un-powered. Typical thicknesses for conductive cathode (122) and conductive anode (126) are 1000-2000 Angstroms, while thicknesses for organic light-emitting material (124) and any other associated layers (not shown) are between 500 and 2000 Angstroms. If each layer of the OLED (128) is on average 1000 Angstroms, then together they are not optically-visible when in the form of an OLED.

Car window (120) can be any window in a car or other motor vehicle, though the windshield and back window are generally preferred in the role of car window (120) for the present invention. Car window (120) is preferable over other car surfaces as the OLED (128) may be placed in the cabin of the car away from the weather while at the same time allowing for visibility of OLED (128) when lighted. Car window (120) may be made of glass, quartz, plastic or any optically-transparent material. The conductive cathode (122), organic light-emitting material (124) and conductive anode (126) are selected both with respect to materials and their applied thicknesses so as allow for layers thin enough not to interfere with driver visual field while electrically-conductive enough to allow for light emission resulting from a voltage applied an across the organic light-emitting material (124). The organic light-emitting material (124) may be any organic material that is capable of emitting light when subjected to a voltage applied to it by a conductive cathode (122) and conductive anode (126) connected to battery (130) as shown in the arrangement in FIG. 1a. Polymer emitters such as PPV (polyphenylenevinylene) and small molecule emitters such as $Alq_3$ (Aluminum tris[8-hydroxyquinoline]) are all appropriate for the role of organic light-emitting material (124) in the present invention. Any organic polymer or organic compound that can be made to produce light in response to a voltage applied to either side of a layer of said organic polymer or said organic compound may be used in the role of organic light-emitting material (124) for the present invention. Polymer light-emitting diodes (PLED's) are thus a subset of OLED's as defined presently. Virtually any color may be generated by appropriate selection of organic light-emitting material (124) and associated organic layers. Such additional layers may serve as hole-transport layers or electron-transport layers (not shown) and may be included in OLED construction for the present invention so as to increase performance efficiency. A final cover layer (150) made of hard polymer may be placed over the OLED (128) arrangement to protect the OLED (128) from scratches and damage. OLED's are ideal for this application as they are both flexible—to follow the curvature of a wind-shield—and they can be produced in nearly any shape, color or arrangement. Alternatively, non-organic emitters may be employed in the present invention as described below.

Figure 1B:
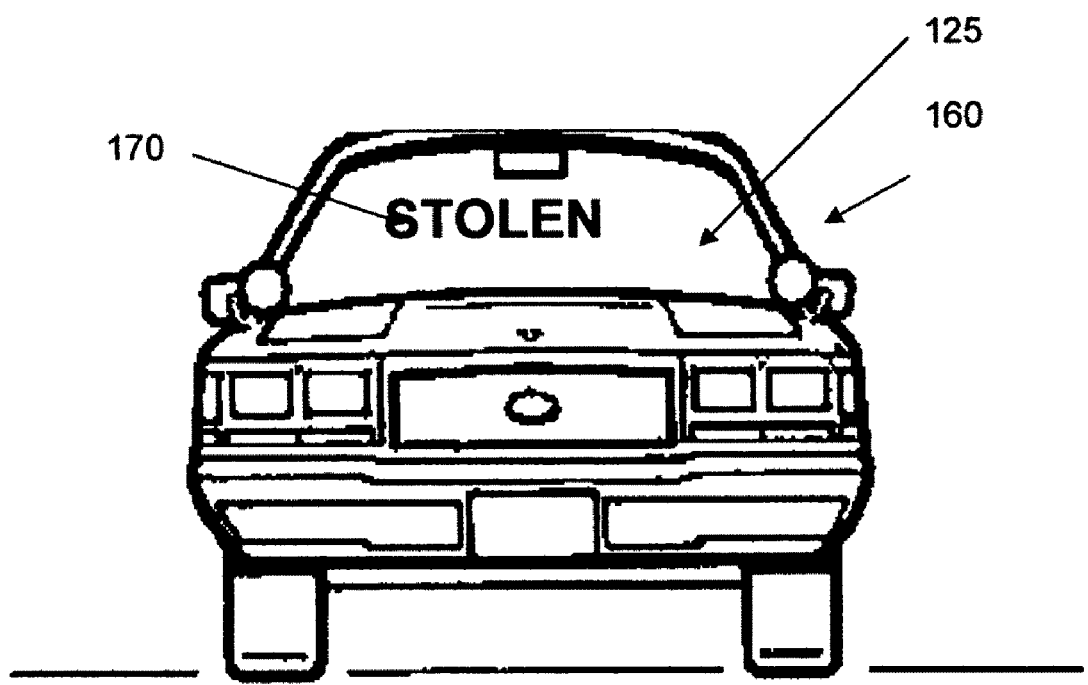
FIG. 1b shows application of the OLED invention on a car window.

As shown in FIG. 1b, front car windshield (125) may be installed in a car (160) in such a manner that a window-associated patterned OLED (170) is present on the inside surface of the front car windshield (125). Alternatively, OLED (128) may be patterned on front car windshield (125) after the front car windshield (125) is already in place in the car (160). An advantage of a window-associated patterned OLED (170) over standard LED's is that the former may be produced in significantly larger sizes and in nearly any shape. Front car windshield (125) as clear substrate may be partially patterned or fully covered with window-associated patterned OLED (170). Patterned OLED (170) may be constructed to form shapes corresponding to letters or words in any language. Alternatively, patterned OLED (170) may be produced in the shape of numbers, symbols or combinations of words, numbers or symbols.

OLED (128, FIG. 1a) is connected through conductive cathode (122) and conductive anode (128) by wires (127) at the base of car window (120)—out of the reach of a potential thief—to a battery (130). The battery (130) may be the car battery or preferably a separate battery dedicated to OLED (128) operation. The battery (130) should be 12-volt rating so as to have enough power to support OLED light generation for an extended period of time. The battery (130) is in turn connected to a human interface keypad (132) in the car cabin. The human interface keypad (132) is generally a numeric or alphanumeric keypad that requires driver input to keep the OLED turned off. Should a driver enter the correct combination of numbers and/or letters, then the OLED remains unpowered and optically transparent. Should a driver not enter a code or the correct code into the human interface keypad (132), then the battery (130) will charge the OLED (128), a light pattern corresponding to OLED patterning (and in a color corresponding to the selected organic light emitting compound [124]) will be displayed. In FIG. 1b, several individual OLED's are constructed on front car windshield (125) and together form a patterned OLED (170) in the shape of the word "STOLEN" which may be viewed outside of the car (160). Passers-by will see the distinct OLED lighting and alert authorities to the status of the car as stolen. The likelihood of apprehension of the thieves is significantly increased with the present car anti-theft system and thieves may choose to abandon car (160) rather than risk arrest.

An optional aspect of the present invention includes an accelerometer (FIG. 1a, 134) to alert the human interface keypad (132) that the car is moving. The present invention determines that a car has been stolen after thievery has commenced. As such, the present invention will generally not be tied into an ignition denial or immobilization system. This fact means that the present car anti-theft system will not be disabled should a car immobilization system be compromised. Rather, once the car has started to move, as recorded by accelerometer (134) or similar device, the human interface keypad (132) will request that driver enter a proper numeric or alphanumeric to keep the OLED off. Should the driver not enter the proper code in a predetermined period of time or attempt to disable the human interface keypad (132), then the battery will be allowed to charge the conductive anode (122) and conductive cathode (126) of the OLED (128) and strong OLED (128) generated light will be emitted through the car window (120) for others to see. Patterning of OLED's may be in the form of strips, geometrical shapes words such as "STOLEN" or "CALL 911" or the like. One could have the OLED (128) cover the entire car window (120) so as to render the latter opaque during theft. The risk in such an approach is that a driver—even a thief—might be prone to cause accidents should the windshield or back window be transiently darkened.

Advantages of the present invention include but are not limited to a car anti-theft system that works during the time of theft. The system does not interfere with normal driving as long as a driver knows the appropriate code to enter into the human interface keypad (132) so as to disable OLED (128) function during the time of normal driving. If the driver does not know the code and the human interface keypad (132) has determined—through the agency of an accelerometer (134), controller or other movement sensitive device—that the car is moving, then OLED (128) may be powered by battery (130)

to generate lighted patterns that will inform passers-by that the car in question is in the process of being stolen. Should a driver enter the proper code after the OLED (128) has been lighted, the battery (130) will cease powering the OLED (128) and the lighting will immediately cease. The car anti-theft system will then remain off for the duration of the present trip. When the car starts to move after a predetermined intermission (so as not to require code entry into the human interface keypad [132] more than once per trip), the driver will again be asked to put a code into the relevant human interface keypad (132) to deactivate the OLED (128) system. In the present system, a car thief will be aware of the OLED lighting during his/her travel from point of theft. He/she can choose to abandon the car or risk that passers-by will inform police of a grand theft larceny auto in progress. In either case, the thief will be challenged from continuing along his/her way. That is not the case with immobilization strategies if they have been overcome. And concern for a GPS chip may be minimal if the car can be broken down quickly enough before police find the stolen vehicle.

The OLED-based car anti-theft system is based on basic scientific as well as social principals:

(1) that an OLED light display system can be patterned onto one side of a car window;

(2) that failure of a driver to disable the OLED system is a signal that the car whose window has the OLED is in the process of being driven by an unauthorized driver;

(3) that a battery can effect OLED light emission by causing hole and electron injection into an organic light emitting material through the use of appropriate conductive cathode and anode materials of optically-clear thicknesses; and (4) that the bright-light presence of warning signs on one or more car windows will cause car thief to either abandon the car or to allow passers-by with cellular phones to alert police of a car theft in progress.

EXAMPLE 1

Figure 2A:
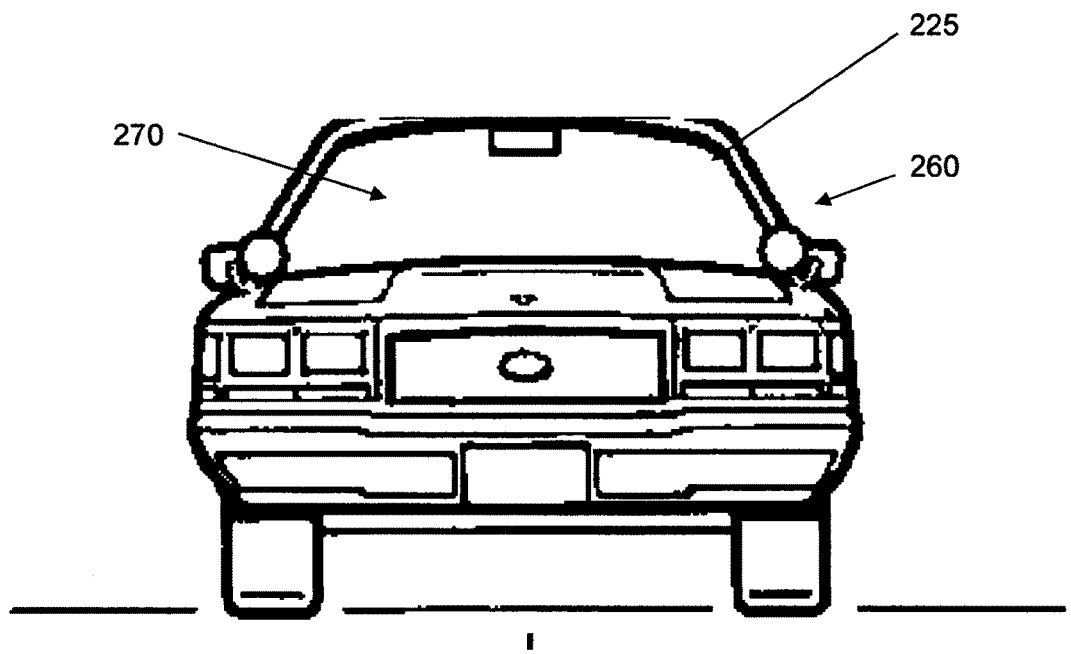
FIG. 2a shows a car-window mounted OLED prior to car theft.
Figure 2B:
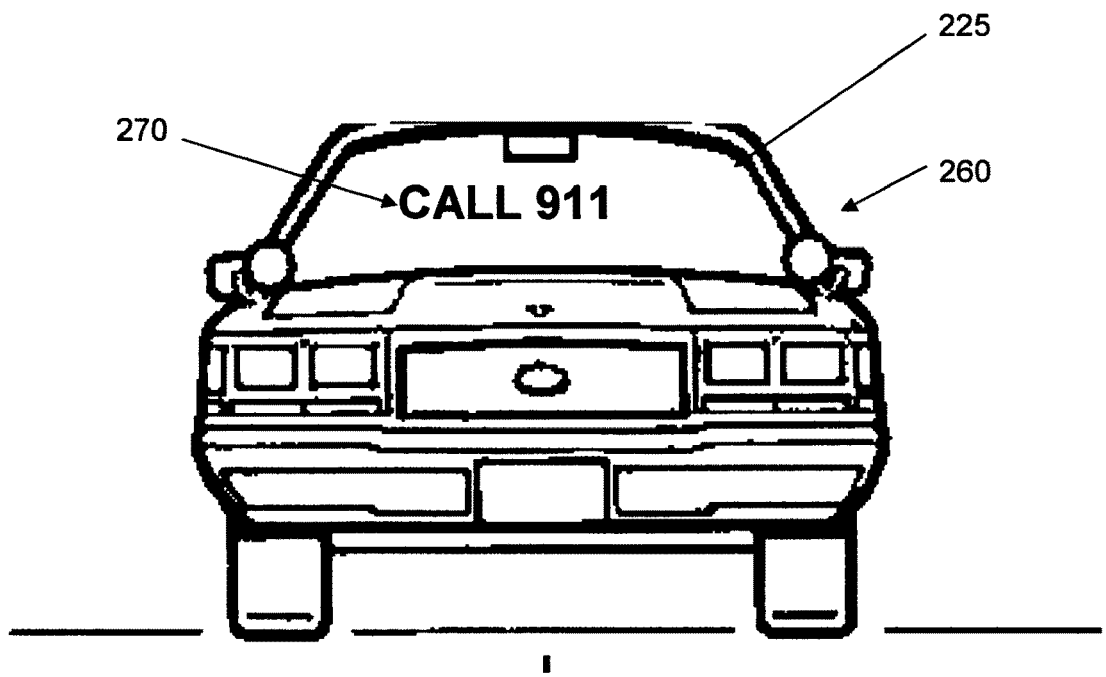
FIG. 2b shows the car-window mounted OLED lighted up in real time during car theft.

Reference is made to FIG. 2a. In the figure is a car (260) with a window-associated patterned OLED (270) in the form of the word expression "CALL 911". This word expression is invisible under normal conditions and is shown in light grey for ease of understanding of the present invention only. "CALL 911" is patterned from multiple separate OLED's on front car windshield (225). In FIG. 2b, during car theft, said OLED's are powered by a battery (not shown in this figure), and the word expression "CALL 911" on the front car windshield (225) is eminently visible to anyone close to the car (260). This state of affairs allows for contact of police for the purpose of capturing the thief/thieves and return of the car (260). Additionally, activation of the window-associated patterned OLED (270) due to car theft causes additional alarm systems (sound-based—not shown; GPS-based—not shown) to function.

EXAMPLE 2

Figure 3A:
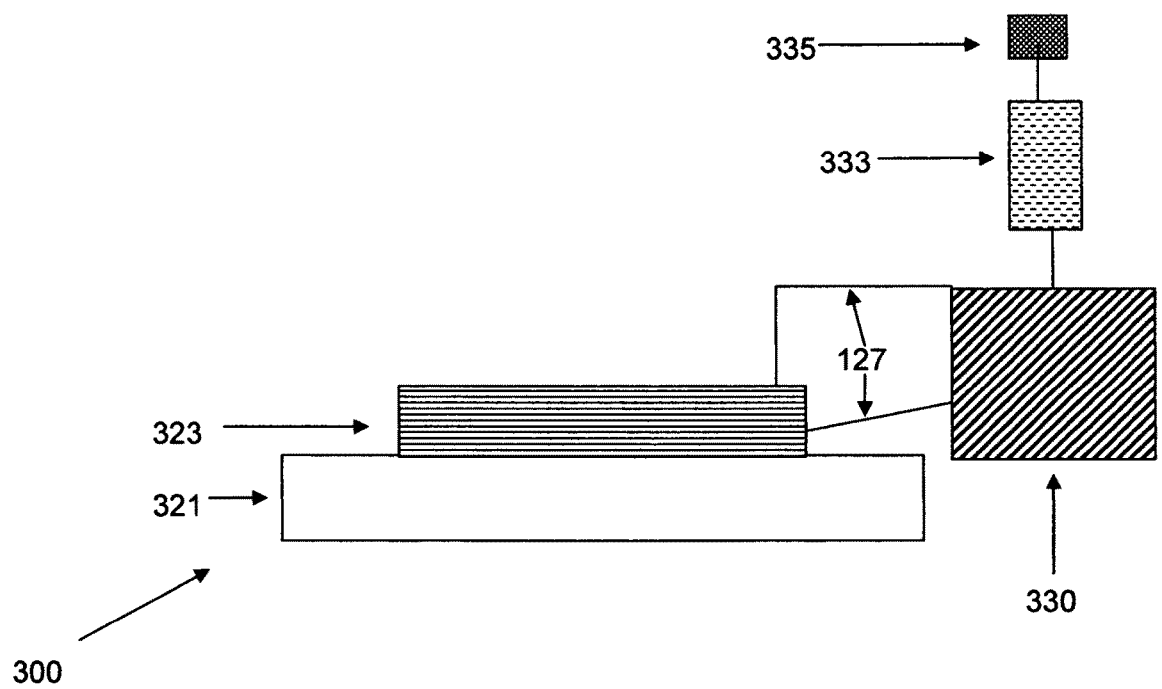
FIG. 3a is a schematic view of an inorganic light-emitter as used in the present invention.
Figure 3B:
FIG. 3b shows application of inorganic light-emitter on external surface of a car.

One does not explicitly need an organic light-emitter for the present invention, though organic LED's have clear advantages with respect to ease of coating curved glass surfaces. Any material that can give off light in response to an applied voltage when said material and its associated electrodes are patterned onto a car window or an external car surface may be used as the lighting component in the present car anti-theft invention. Reference is now made to FIG. 3a, which is a schematic view of a car anti-theft system (300) that is constructed and operative in accordance with an embodiment of the invention. Specifically, the car anti-theft system (300) includes an external car surface (321) onto which is patterned an inorganic light-emitter (323) attached with two wires (327) to a battery (330). The battery is in turn connected to a retina scanner (333) that is in turn connected to a motion-detector element (335). If the retina scanner (333) does not recognize the person sitting in the driver's seat after the motion-detector element (335) has determined that the car is moving, then the inorganic light-emitter (323) will be powered up by the battery (330). When the battery (330) powers up the inorganic light-emitter (323) in response to unauthorized car travel, the inorganic light-emitter (323) will give off light visible to passers-by. In FIG. 3b, an external-car surface-associated patterned light-emitter (371) shows the expression, "CALL POLICE" on a car grill (326) after retina scanner (FIG. 3a, 333) does not recognize driver of the car (360). Inorganic light emitters include but are not limited to standard LED's made from p-n junctions associated with silicon.

EXAMPLE 3

A primary car alarm system (Viper 7900, Viper, Inc., Vista, Calif., USA) is installed on a BMW Series 6 sedan. Additionally, OLED's are patterned on the interior sides of the front and back windows of said BMW, with the OLED's spelling out "CALL POLICE" in six inch letters (visible only when powered). OLED's are formed by patterning indium tin oxide layers (ITO, 100 nanometers) for anodes on said windows, followed by deposition of AlQ3 (200 nanometers) above the ITO layers, AlQ3 acting as an organic emitter and finally barium metal cathode layers (200 nanometers) on top of the AlQ3. Electrical leads are contacted to the cathode and anode and are in turn connected to a 12 volt battery, with an additional electrical connection to the Viper 7900 system. It is understood that other materials than those mentioned may be used for cathode, anode and organic emitter. Multiple unique organic materials can be used in the construction of an OLED; oftentimes, hole-emitters and electron emitters are deposited separately between cathode and anode. OLED's on the front and back windows can be connected to the same battery or to different batteries. Additionally, letters can be electrically interconnected (as in script-writing, for example) so as to have all of the letters powered-up by a single electrical circuit; alternatively, each letter can be a distinct OLED attached separately to the battery. Said OLED's are integrated into the Viper 7900 system such that when the Viper 7900 car alarm is activated, said OLED's are powered up to display "CALL POLICE" on the front and back windshields of said BMW. In this example, a primary car alarm system (Viper 7900) is enhanced through integration of OLED's that are patterned on car surfaces and visible by police officers and bystanders. OLED's thus integrated into primary car alarm systems allow for additional visual signals that a car or vehicle is the subject of theft. This added layer of protection aids GPS, audible and other signals that may provide data on a theft of vehicle. OLED's are powered up only when the primary alarm system detects vehicle theft or unauthorized entry. Additionally, presentation of "CALL POLICE" on the windows of a stolen car should thoroughly distract a thief and cause him/her to abandon the car.

Figure 4:
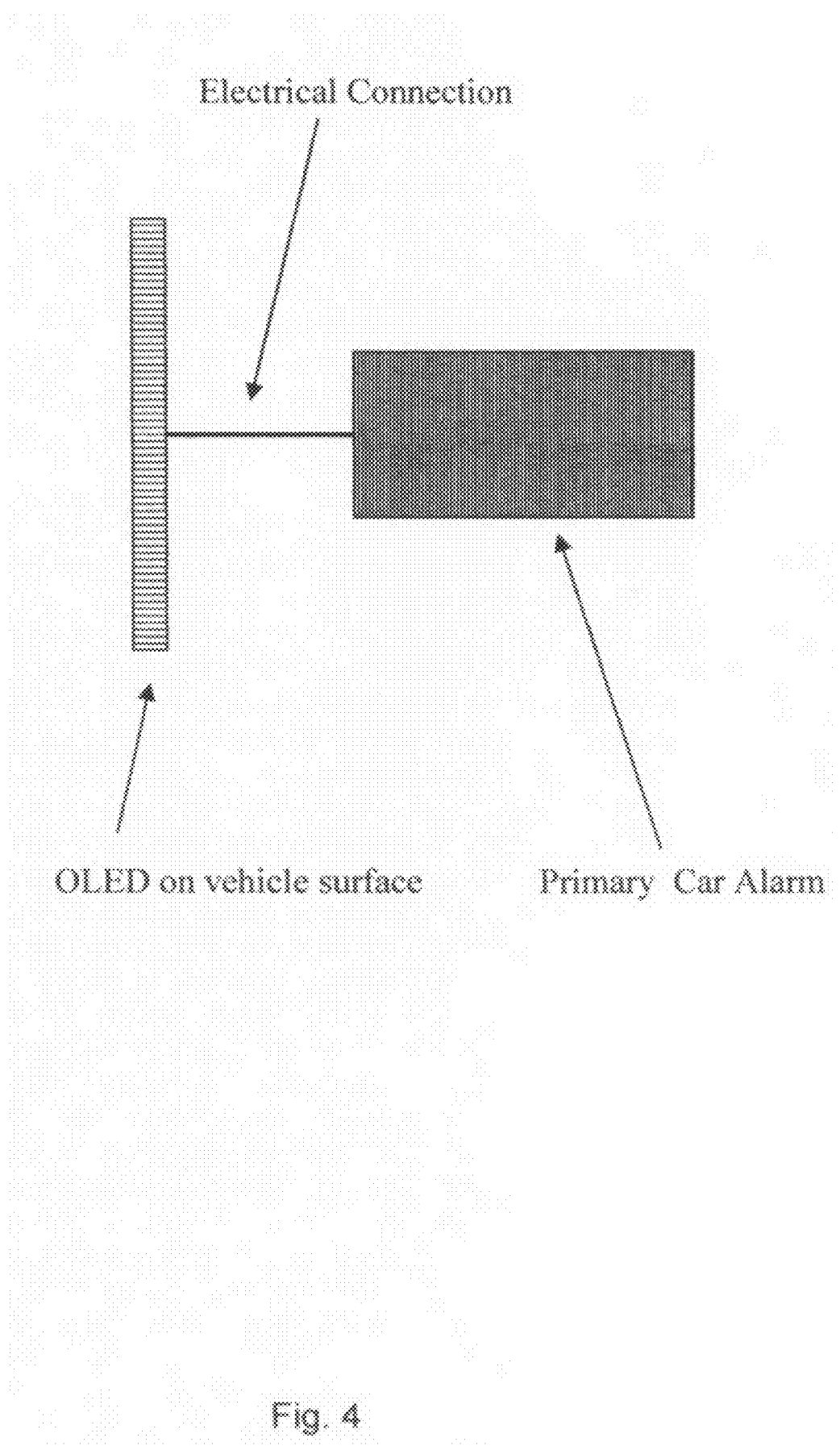
FIG. 4 shows integration of OLED's with a primary alarm system.

FIG. 4 shows a schematic representation of the alarm system presented in Example 3. Specifically, a primary alarm system is electrically contacted to OLED's patterned or placed on a visible surface of a vehicle. Activation of the primary alarm through car ignition of unauthorized door opening, will cause OLED's to be powered up and visible to passers-by.

Just as in the previous example, the emitter was coated onto an external car surface (321), one could make and OLED on a clear plastic surface and then attach said clear plastic surface with OLED onto a car window or other appropriate car surface. Patterning does not have to be specifically on a car window as one could make an OLED and independently attach it to a car window.

The implication of the invention described herein is that foiling of a car burglary may occur during the transit time of a stolen vehicle. The car anti-theft system described herewith is easily deactivated by car's owner but perforce will work in the presence of an unauthorized driver. As such, the present invention offers an important additional layer of car protection after a car thief has succeeded in overcoming any initial immobilization strategy. This invention could potentially reduce the large number of cars annually stolen in the U.S. Obviously, the present invention can be used independently or in conjunction with other car anti-theft systems. Should a car thief attempt to inactivate an embodiment of the present invention, then the battery will automatically light up the OLED's or other light display for easily visualization.

The present invention has been described with a certain degree of particularity, however those versed in the art will readily appreciate that various modifications and alterations may be carried out without departing from the spirit and scope of the following claims. For example, instead of accelerometer being used to determine that the car is moving, one could put a weight sensor under the driver's seat to determine that someone is present in the driver's seat. Alternatively, a traditional key, retina scan, finger print or other identification system may be used as an appropriate human interface to allow for driver-authorized inactivation of the OLED. Therefore, the embodiments and examples described here are in no means intended to limit the scope or spirit of the methodology and associated devices related to the present invention. Preferred embodiments of the present invention may act independent of or in conjunction with other vehicle alarm systems.

One point to note is that the present invention serves to protect a car from unauthorized transit. This system is wholly different from that found on many taxis in which a threatened authentic driver can turn on a "Call 911" sign located on the roof of the taxi. In the latter scenario, the original driver is present and being threatened. The present invention, on the other hand, works in the absence of the proper driver when the car is being stolen.

It will be clear to anyone versed in the art that the structure of an OLED on a clear substrate car window can also allow for decorative purposes without any relation to a car anti-theft system. One could put decorative patterned OLED's on car windows to be operated by a car driver for pleasure or the purpose of communication with pedestrians, law enforcement officials or other drivers. The present invention anticipates such uses of car window-based OLED systems. The OLED as anticipated in this invention is on the inside of the car window to protect the OLED from weather damage. One could alternatively construct an OLED on the outside portion of a car window or on an external car surface. The OLED according to the present invention can be kept lighted once activated or can be allowed to flash or blink.

It will be understood that the present invention may work in tandem or may be integrated with other alarm-based systems. Thus, if in some embodiments of the present invention detects that a vehicle has been stolen as described above, then other car alarm systems may be alerted or activated. For example, should an embodiment of the present invention determine that a car has been stolen, it will activate OLED's and it may additionally alert a GPS-based car detection system that the car in question is being stolen. Such GPS-based systems may not be able to determine that the movement of a vehicle is due to action of an unsanctioned driver.

While the present invention has described patterning of light-emitters, organic or otherwise, on windows, one could prepare the emitters (such as an OLED) on a plastic surface and then attach the plastic surface on the inside or outside of a car window. The invention herewith enclosed may also be augmented with sounds generated in combination with activation of an OLED or light-emitter system during car theft.

The invention claimed is:

1. A car anti-theft system activated against the will of a driver, comprising:
    a vehicle surface;
    an organic light-emitting diode (OLED) patterned on said vehicle surface,
        wherein said OLED spells out a word pattern that said car is being stolen;
    a human interface keypad within arm's reach of said driver, controlling lighting of said OLED;
    an accelerometer, said accelerometer activating said human interface keypad when said car is moving;
    a battery that is in electrical contact with said organic light-emitting diode, said accelerometer, and said human interface keypad; and,
    prompting said driver to interact with said human interface keypad after said accelerometer has determined that said car is moving,
        wherein said driver interaction includes entering a proper numeric or alphanumeric code in a predetermined period of time, will cause said OLED to not spell out said word pattern; and,
        wherein said driver interaction includes not entering the proper numeric or alphanumeric code in the predetermined period of time or attempting to disable the keypad, will cause said OLED to spell out said word pattern.

2. The system according to claim 1, wherein said organic light-emitting diode minimally includes a cathode, an anode and one organic light-emitting material.

3. The system according to claim 1, wherein said organic light-emitting diode forms said word pattern that can be read outside of said car window.

4. The system according to claim 3, wherein said word pattern formed reads "CALL 911" or "STOLEN".

5. The system according to claim 3, wherein said vehicle surface is realized as a car windshield.

6. A method of activating a car anti-theft system against the will of a driver including the steps of:
    providing a car window;
    patterning an organic light-emitting diode (OLED) on the inner face of said car window,
        wherein said OLED spells out a warning that said car is being stolen;
    coupling said OLED electrically to a battery;
    providing a human interface keypad activated by an associated accelerometer; linking said battery to said human interface keypad,
        wherein said keypad is within arm's reach of said driver, controlling lighting of said OLED; and,
    prompting said driver to interact with said human interface keypad after said accelerometer has determined that said car is moving,
        wherein said driver interaction includes entering a proper numeric or alphanumeric code in a predetermined period of time, will cause said OLED to not spell out said warning; and, wherein said driver interaction includes not entering the proper numeric or alphanumeric code in the predetermined period of time or attempting to disable the keypad, will cause said OLED to spell out said warning.

7. The method according to claim 6, wherein said OLED is minimally comprised of a cathode, an organic light emitting material and an anode.

8. The method according to claim 7, wherein said electrical coupling is performed by separately attaching said cathode and said anode with wires to a battery.

9. The method according to claim 6, wherein said car window is the front car windshield.

10. The method according to claim 6, wherein said human interface keypad is placed on a dashboard of said car.

11. The method according to claim 6, wherein said OLED is composed of multiple colors.

12. The method according claim 6, wherein said OLED is realized as a plurality of unique OLED's.

13. The method according to claim 6, wherein said anti-theft system is used in conjunction with a different anti-theft system.

* * * * *